United States Patent
Statham

[11] Patent Number: 6,132,316
[45] Date of Patent: Oct. 17, 2000

[54] CONSTANT-VELOCITY-RATIO UNIVERSAL JOINTS

[75] Inventor: Dominic Rhys Statham, Warwick, United Kingdom

[73] Assignee: GKN Automotive AG, Lohmar, Germany

[21] Appl. No.: 09/214,526
[22] PCT Filed: Oct. 29, 1997
[86] PCT No.: PCT/GB97/02980
§ 371 Date: Jan. 6, 1999
§ 102(e) Date: Jan. 6, 1999
[87] PCT Pub. No.: WO98/19073
PCT Pub. Date: May 7, 1998

[30] Foreign Application Priority Data

Oct. 31, 1996 [GB] United Kingdom .................. 9622697
Oct. 31, 1996 [GB] United Kingdom .................. 9622698

[51] Int. Cl.[7] ................................................. F16D 3/16
[52] U.S. Cl. ............................................................ 464/145
[58] Field of Search ................................. 464/139, 141, 464/142, 143, 145, 906

[56] References Cited

U.S. PATENT DOCUMENTS

| | | | |
|---|---|---|---|
| 5,288,273 | 2/1994 | Krude ...................................... | 464/145 |
| 5,451,185 | 9/1995 | Krude et al. ........................... | 464/145 |
| 5,509,857 | 4/1996 | Flaugher ................................ | 464/906 |
| 5,947,826 | 9/1999 | Seguin .................................... | 464/145 |

FOREIGN PATENT DOCUMENTS

| | | | |
|---|---|---|---|
| 03112123 | 11/1991 | Japan . | |
| 4194418 | 7/1992 | Japan ..................................... | 464/145 |
| 5172153 | 7/1993 | Japan ..................................... | 464/145 |
| 1556911 | 8/1977 | United Kingdom . | |
| 2103963A | 8/1982 | United Kingdom . | |
| 2155367A | 3/1985 | United Kingdom . | |

OTHER PUBLICATIONS

British Patent Office Search Report, GB 9622697–2 dated Jan. 20, 1997.
British Patent Office Search Report, GB 9622698–0 dated Dec. 20, 1996.

*Primary Examiner*—Lynne H. Browne
*Assistant Examiner*—Aaron Dunwoody

[57] ABSTRACT

A fixed, ball-type constant velocity joint includes an outer member (10) having ball-receiving tracks (17) and lands (18) between the tracks. The lands engage the external surface (21) of a cage (12) and are provided with relief portions (25) which extend across the whole circumferential widths of the lands. The relief portions are located between first and second contacting portions of the external cage surface and the facing land surfaces. The provision of the relief portions facilitates the formation of the land surfaces by reducing the area which has to be accurately shaped. The lands are hardened but before hardening may be provided with the relief portions (25). After hardening no treatment to remove metal is applied to the surfaces in which a relief portion has been provided except, optionally, for the removal of scale produced by

19 Claims, 10 Drawing Sheets

CONSTANT-VELOCITY-RATIO UNIVERSAL JOINTS

TECHNICAL FIELD

This invention relates to fixed (i.e. non-plunging) constant-velocity-ratio universal joints, of the kind which comprises:

an outer joint member of hollow configuration, having a rotational axis and in its interior a plurality of at least partially arcuate tracks circumferentially spaced about said axis and whose centre lines extend in meridian planes relative to said axis, there being lands defined between said tracks and integral with the outer joint member, the lands having radially-inwardly directed surfaces;

an inner joint member disposed within the outer joint member and having a rotational axis, the inner joint member being provided on its exterior with a plurality of tracks whose centre lines lie in meridian planes with respect to the rotational axis of the inner joint member and which face the tracks in the outer joint member in opposed pairs, there being lands defined between the tracks on the inner joint member, the last-mentioned lands having radially-outwardly directed surfaces;

a plurality of balls disposed one in each pair of facing tracks in the outer and inner joint members for torque transmission between the members;

a cage of annular configuration disposed between the joint members and having openings in which respective balls are received and constrained so that their centres lie in a common plane; the cage having external and internal surfaces each of which cooperates with the land surfaces which face it to locate the cage and the inner joint member axially;

the configuration of the tracks in the outer and inner joint members, and/or the internal and external surfaces of the cage, being such that when the joint is articulated the common plane containing the centres of the balls (the bisector plane) is caused substantially to bisect the angle between the rotational axes of the joint members.

Such a joint will hereinafter be referred to as "a joint of the kind specified".

DESCRIPTION OF RELATED ART

There are several types of joint of the kind specified, differing from one another, inter alia, in respect of the arrangement and configuration of the tracks in the joint members and/or of the internal and external surfaces of the cage whereby the common (bisector) plane is guided as aforesaid thereby giving the joint constant-velocity-ratio operating characteristics. What such different types of joints have in common, however, is that the cage is located axially in the joint by cooperation between the external cage surface and the surfaces of the lands facing such cage surface.

Theoretically, in a joint of the kind specified, these cooperating surfaces should be part-spherical and there should be a very close conformity between the shape of the external surface of the cage and the complementary surfaces on the lands on the outer joint member with which it cooperates (sufficient clearance being provided only for a film of lubricant therebetween). In practice such close conformity is very difficult to achieve within the normal allowable tolerances.

When torque is being transmitted by the joint, the forces acting in the joint cause the cage to be urged towards one end of the joint; which end will depend on the respective directions of the offsets of the tracks in the inner and outer joint members from said common plane when the joint is in its unarticulated position. If the cooperating surfaces on the cage and the lands of the outer joint member, which in theory should be part-spherical, are not ground accurately, the forces acting in the joint can cause the cooperating surfaces on the cage and the lands to tend to become jammed together with a wedging action. Thus for example if the inwardly facing surfaces of the lands on the outer joint member are, in longitudinal cross-section through the joint, of a larger radius of curvature than the cooperating outwardly facing surface of the cage, the joint may run with the cage continually in a condition of incipient jamming. The result is generation of heat and rapid wear.

This problem can be overcome by designing one or both surfaces of the cooperating pair to be not truly part-spherical about the rotational axis of the component whereon it is provided, but instead a surface of revolution about said axis of an arc whose centre of curvature is not on such axis but is offset therefrom. The aim is to achieve cooperating surfaces which contact one another in end regions only of the components whereon they are provided. To achieve this, in longitudinal section the radius of curvature of the inwardly facing cooperating surfaces of the lands should be slightly less than the radius of curvature of the outwardly facing cooperating surface of the cage. It is important that the difference in such radii of curvature should not be too great otherwise the contact areas between cage and the outer joint member will be small giving rise to high pressures and rapid wear. This combination of surface radii of curvature permits greater tolerances to be allowed in manufacture than if one tried to grind the surfaces to the same radii of curvature but, even so, very tight control of the tolerances in the configuration of the surfaces is still necessary which renders production difficult.

Accordingly, it is an object of the present invention to provide a universal joint of the kind specified in which this problem is overcome or ameliorated.

DESCRIPTION OF INVENTION

According to one aspect of the present invention we provide a joint of the kind specified wherein, when the joint is transmitting torque, there are first contacting portions of the external surface of the cage and the facing land surfaces of the outer joint member adjacent one end of the outer member which are in contact and resist the axial forces on the cage due to the joint geometry, wherein there is a relief portion (as hereinafter defined) located, when the joint is in its unarticulated position, generally adjacent to the common (bisector) plane and preferably either between the first contacting surface portion in each of said facing land surfaces and the common plane or about the common plane, each relief portion extending across the whole circumferential width of the land between the tracks that border the land, and wherein there are second contacting portions of the external cage surface and the facing land surfaces of the outer joint member to control the axial float of the cage and which are separated from the first contacting portions by the relief portions.

By "relief portion" of an outer joint member land surface we mean a surface portion of the outer joint member land which, during articulation and use of the joint to transmit torque, does not contact the facing external surface of the cage and which:

is separated from the adjacent first contacting surface portion by a step in the surface of the component or an abrupt change in the gradient of said surface in longitudinal section; or is defined by a surface or surfaces the or each of which has a different radius of curvature from the surface of the adjacent first contacting surface portion and which may be tangential to the surface of said first contacting surface portion; or in longitudinal section is straight; or is defined by a surface which in longitudinal section meets the surface of the adjacent first contacting surface in a point of inflexion.

By "longitudinal section" we mean a section in a plane through the rotational axis of the joint when it is in its unarticulated position.

In present designs of joints of the kind specified it is contact between inappropriately-shaped surfaces of the cage and a joint member in an axial mid-region of such components which is largely the source of the jamming problem.

According to another aspect of the present invention we provide a joint of the kind specified wherein, when the joint is transmitting torque, there are first and second hardened contacting portions of the external cage surface and the facing land surfaces of the outer joint member, the first contacting portions being adjacent to one end of the joint and being in contact to resist the axial forces on the cage due to the joint geometry and the second contacting portions controlling the axial float of the cage and wherein there is a relief portion (as hereinbefore defined) between the first and second contacting surface portions across the whole of the circumferential width of each of said facing land surfaces, the or each of said relief portions being located generally adjacent to the common (bisector) plane when the joint is in its unarticulated position and wherein said relief portions have been produced in said land surfaces before the latter have been hardened and wherein, after hardening, no treatment to remove metal has been applied to said land surfaces in which a relief portion has been provided except, optionally, for the removal of scale produced by said hardening.

We also provide a method of making an outer joint member of a joint of the kind specified in a finished state ready for use in said joint comprising making a blank for the member, simultaneously or sequentially producing the tracks, the lands and a relief portion (as hereinbefore defined) in the surface of each of said lands, said relief portion extending across the whole circumferential width of the land and being located generally adjacent to the common (bisector) plane when the joint is in its unarticulated position and heat treating the member to harden the surfaces of the lands but applying no further treatment to said land surfaces to remove metal therefrom after hardening of the member except, optionally, for the removal of scale produced by said hardening.

Various prior proposals have been made in which there is a relief between various parts of the joint.

Thus Japanese Utility Model 3-112123 describes a plunging constant velocity joint in which there is a relief on the inner member and/or the inner surface of the cage to act as a lubricant reservoir.

U.S. Pat. No. 5,433,668 describes a fixed, ball-type, constant velocity joint in which the axial clearance of the cage in the outer joint member is adjusted by fingers on a ring, the ends of the fingers engaging the external surface of the cage and the ring being secured to the lands of the outer joint member at the open end thereof, The cage only contacts the fingers and does not contact the outer joint member.

U.S. Pat. No. 4,820,240 describes a fixed, ball-type constant velocity joint in which there is an axial clearance between the facing surfaces of the inner joint member and the cage and wherein the facing surface of the cage and the outer member comprise a spherical guide surface and a short bearing surface.

U.S. Pat. No. 4,156,353 discloses a fixed, ball-type constant velocity joint in which the external surface of the cage and the facing land surfaces of the outer joint member are only in contact adjacent to the open end of the joint and the external surface of the inner joint member and the internal surface of the cage are only in contact adjacent to the closed end of the joint.

None of these proposals solves the problem set out above while controlling the axial float of the cage.

By virtue of the relief portions in joints embodying the invention, the area of potential cage/outer joint member contact is reduced to where contacting surface portions are required. thus the very tight tolerances needed to provide different radii of curvature on the facing surfaces to prevent wedging and jamming of the cage relative to the outer joint member is avoided. This facilitates manufacture and the ability to cope with differences in the amount of stock to be removed from different parts of a component when providing the sphere form of the land surfaces in the outer joint member.

Thus in the longitudinal cross-section of a joint embodying the invention the configuration of the contacting surface portions of the outer joint member and the cage becomes less critical. The contacting surface portions can be designed to be truly part-spherical, with advantages in achieving contact therebetween over relatively large surface areas (thus reducing wear) whilst avoiding the wedging problem.

Preferably, each of the first contacting surface portions is substantially part-spherical. To aid manufacture, each of the second contacting surface portions is preferably also substantially part-spherical. The first and second contacting surface portions preferably lie on the same part-spherical surface centred on the rotational axis of the outer joint member.

Preferably only the land surfaces of the outer joint member have relief portions.

As stated above the relief portions may extend on both sides of said common plane when the joint is in its unarticulated position or may extend only on one side of said plane between the common plane and the adjacent first contacting surfaces.

Preferably in the manufacture of joints or outer joint members embodying the invention the contacting portions and relief portions are produced with the components in their soft state i.e. before hardening. Because the area of potential cage-joint member contact is reduced, changes from the spherical form of the member arising from the heat treatment of hardening can be accommodated more readily. If the spherical surfaces are machine generated rather than machine formed (e.g. by turning rather than form grinding) faster cycle times can be realised as the slow feed rates are required over shorter distances. On the other hand where the land surfaces are machine formed lower tooling costs may result as there is less area to form.

The combination of the provision of the relief portions in the outer member and their formation prior to heat treatment and the fact that no surface treatment to remove metal is applied to the surfaces having the relief portions after heat treatment, except possibly de-scaling, eliminates costly post-heat treatment machining operations of the lands such as grinding.

BRIEF DESCRIPTION OF THE DRAWINGS

The invention will now be described by way of example with reference to the accompanying drawings in which.

BEST MODE FOR CARRYING OUT THE INVENTION

Figure 1:
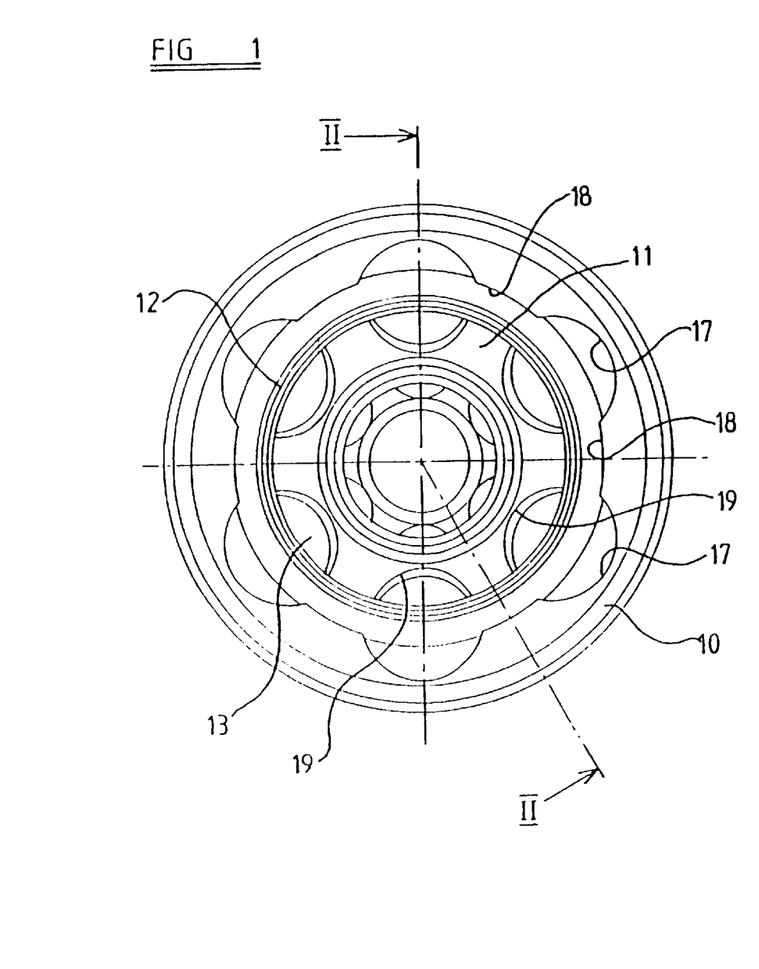
FIG. 1 is an end view of a fixed constant-velocity-ratio joint embodying the invention taken in the direction of the arrow A in FIG. 2.
Figure 2:
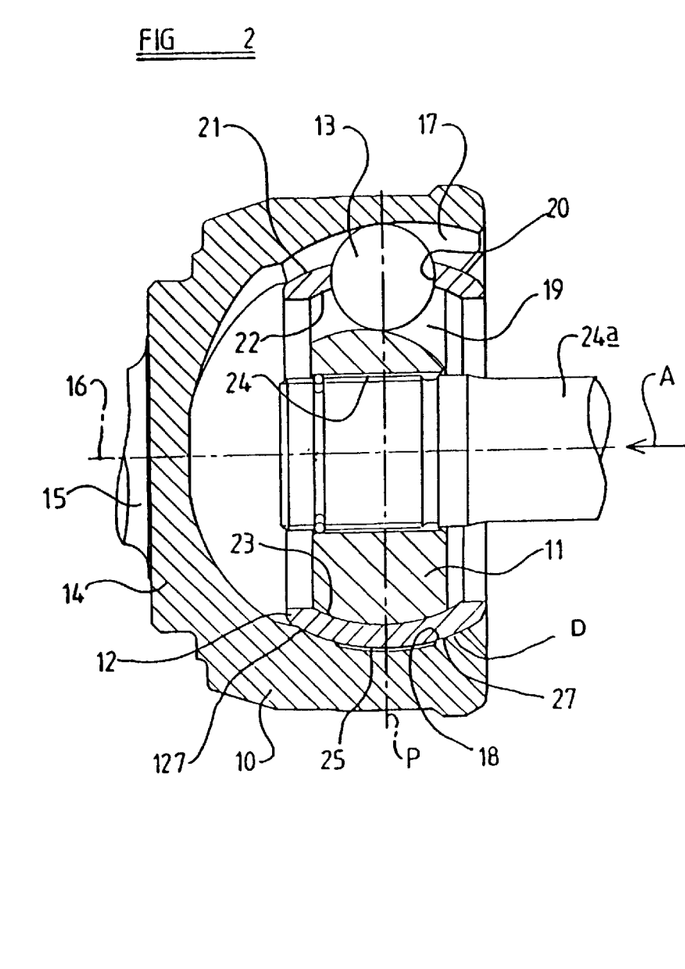
FIG. 2 is a longitudinal section through the joint of FIG. 1 on the line II—II of FIG. 1.

Referring firstly to FIGS. 1 and 2 of the drawings, these show a fixed constant-velocity-ratio joint whose principal components are an outer joint member indicated generally at 10, an inner joint member 11, a cage 12 and a plurality of torque-transmitting balls 13.

The outer joint member 10 is a hollow cup-shaped component with a closed end 14 from which a stub shaft 15 extends. The axis of rotation of the outer joint member is indicated at 16. In the interior of the outer joint member there is a number of circumferentially spaced arcuate tracks 17 which are equi-angularly spaced about the joint member axis and whose centre lines lie in meridian planes containing the axis 16. Between the tracks 17 there are defined lands 18 which are integral with the joint member and have radially inwardly directed surfaces.

The inner joint member 11 is provided on its exterior surface with a number of arcuate tracks 19 whose centre lines lie in meridian planes containing the axis of rotation of the inner joint member which, when the joint is in the aligned (non-articulated) condition illustrated, is coincident with the axis 16. The tracks 19 face the tracks 17 in opposed pairs. Between the tracks 19 the inner joint member has lands 23 which are integral with the inner joint member and have radially outwardly directed surfaces. The inner joint member 11 is a hollow component, having a splined bore 24 for torque-transmitting reception of a drive shaft 24a.

In the longitudinal cross-section shown in FIG. 2, the tracks 17, 19 are arcuate in configuration and the centres of curvature of such arcs are off-set from one another axially of the joint so that the tracks of each pair diverge from one another as they approach the open end of the outer joint member. Each pair of opposed tracks 17, 19 receives a respective torque-transmitting ball 13, the centres of the balls lie in a common plane P. The offset configuration of the tracks 17, 19 in the joint members is such that, in known manner, when the joint is articulated the common plane P (the bisector plane) in FIG. 2 is caused to bisect the angle between the rotational axes of the joint members, thereby giving the joint constant-velocity-ratio characteristics.

The cage 12 is an annular component interposed between the inner and outer joint members. It has a plurality of openings 20 respectively receiving the balls 13 so that the centres of the balls lie in the common plane P.

The cage has an external surface 21 which contacts the radially-inwardly facing surfaces of the lands 18 between the tracks 17 of the outer joint member. The cage also has an internal surface 22 engageable with the radially-outwardly facing surfaces of the lands 23 between the tracks 19 in the inner joint member 11.

When the joint is in use, forces acting on the balls and thus on the cage urge the latter towards the open end of the outer joint member 10. Thus the external surface of the cage bears on the facing surfaces of the lands 18 of the outer joint member primarily in an area D immediately adjacent the open end of the outer joint member. In the joint shown the offset of the tracks in the inner member 11 is towards the closed end 14 of the outer joint member 10 and the offset of the tracks in the outer joint member is towards the open end of the outer member. However the direction of the offsets could be reversed which would change the location of the first contacting surface portions to a position adjacent to the closed end of the outer joint member.

The surfaces of the lands 18, 23 are preferably part-spherical, forming parts of a sphere centered on the axis of rotation 16 of the outer member 10 or the inner member 11 respectively. However the land surfaces may be formed of surfaces of revolution of a circular arc about said axes but with the arc not being centered on the axis. In another arrangement the arc is not circular. The land surfaces could alternatively be formed by surfaces of revolution of an arc, which is preferably but not necessarily circular, about an axis of revolution offset from said axes of rotation of the members, the locus of the axis of revolution, when considering all the land surfaces, being a circle around the axis of rotation. As will be clear to one skilled in the art, any departure of the land surfaces from true part-spherical surfaces centred on the axes of rotation will be small.

In the embodiment of the invention shown in FIGS. 1 and 2, the inwardly facing surfaces of the lands 18 of the outer joint member are relieved as indicated at i5. The relief portion extends on both sides of the common plane P when the joint is in its unarticulated position shown in FIG. 2 and its ends are defined by steps. Each relief portion extends across the whole width of the land between the tracks on either side of the land.

Figure 3:
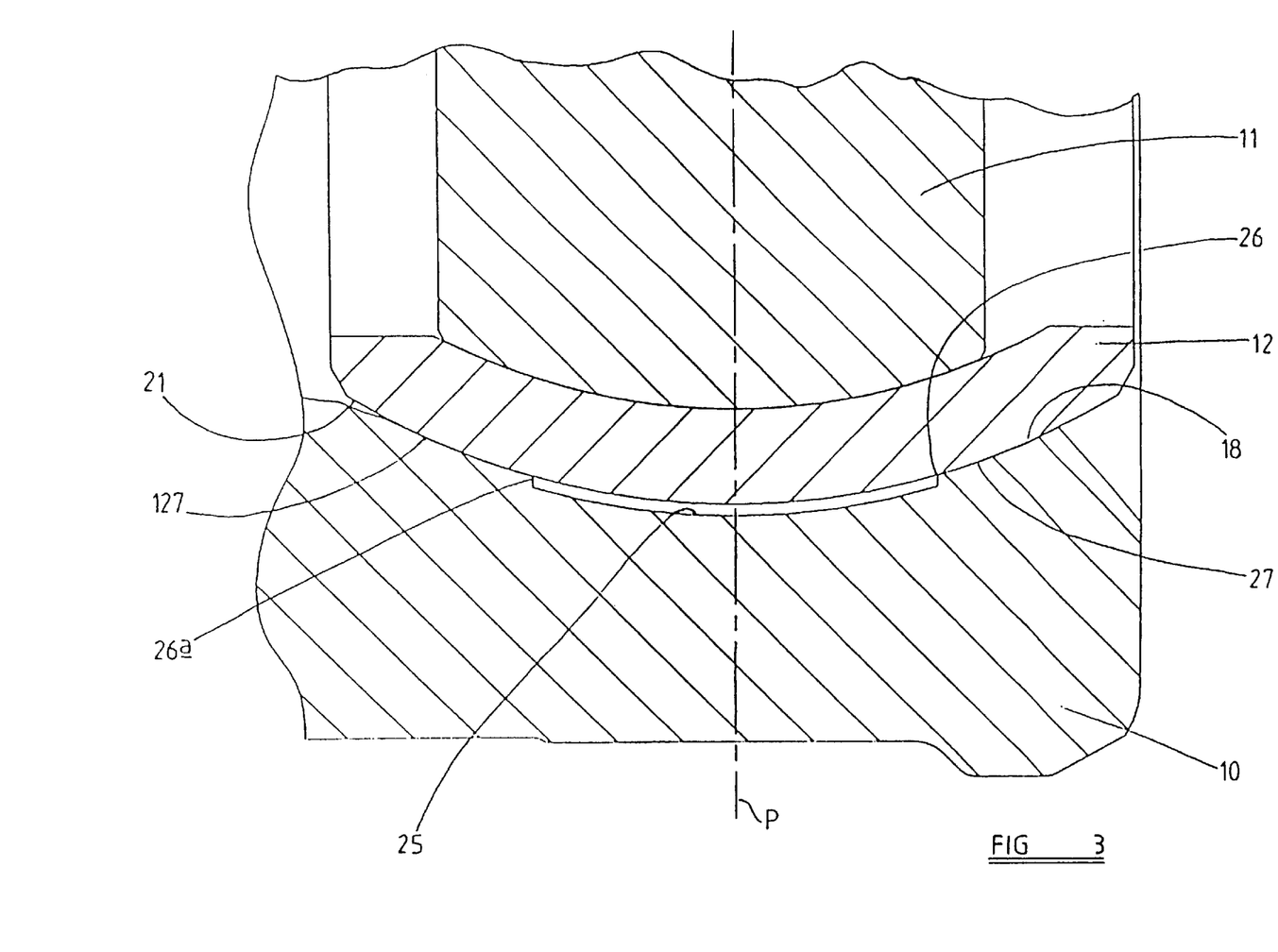
FIG. 3 is an enlarged portion of the section of FIG. 2 showing a relief portion in more

In FIG. 3, the step in the surface at which each such relief portion starts adjacent to the open end of the outer joint member is indicated at 26 and the opposite end is indicated by a step 26a. This leaves first contacting surface portions 27 of the land surfaces between the relief portion 25 and the open end of the outer joint member. These portions 27 contact the external surface 21 of the cage. The engagement of the surface portions 27 with the external surface of the cage resists the axial forces on the cage which occur during operation of the joint.

Each relief portion 25 may have a depth no greater than 150 microns (0.150 mm), e.g. between 50 and 100 microns, with respect to the land surface at the ends of the relief. A preferred depth range is between 30 and 100 microns. The relief portions should be as shallow as possible whilst preventing the outer cage surface from coming into contact with the inwardly facing surface of the relief portion during use and articulation of the joint and should not be so deep as to reduce the depth of the tracks in the outer joint member to the extent that disadvantageous contact conditions between the balls and the tracks result. The provision of the relief portions reduces the surface portions on the lands which have to be shaped accurately to the portions 27 thus easing production.

The provision of the relief portions has the effect that any tendency for the cage to operate in a state of incipient wedging or jamming relative to the outer joint member is substantially avoided without the necessity to hold tight tolerances over the whole of the lands on the outer joint member. The cage is still satisfactorily guided by virtue of its contact, under torque transmission, with the unrelieved first contacting portions 27 of the lands 18 immediately adjacent the open end 10 of the outer joint member.

A further effect of the provision of the relief portions 25 in accordance with the invention is that they afford reservoirs for lubricant adjacent to cooperating surfaces of the cage and outer joint member so that lubrication of such surfaces may be improved.

Yet a further effect of the provision of the relief portions is that when the joint is subject to high torque, under which conditions it might be possible for the high radial forces to distort tile outer joint member to an out-of-round condition the cage is less liable to be squashed by the outer joint member. If the relief portions were not present, the distortion of the outer joint member could cause it to tighten on the cage.

Referring again to FIGS. 1 and 2 the cooperation of the contacting surface portions 27 on the lands of the outer joint member with the external surface 21 of the cage resist the axial forces on the cage during operation of the joint. To control axial float of the cage relative to the outer joint member there are second surface portions 127 on the lands 18 adjacent the closed end of the joint which engage the external surface 21 of the cage. The surfaces 27 and 127 on each land of the outer joint member are separated by the relief portion 25. It is to be noted that the relief portion 25 extends on both sides of the common plane P when the joint is in its unarticulated position. However the relief portion could merely extend between the contacting portions 27 and the common plane P.

In the production of joints embodying the invention, there is no need to control the configuration of the lands in the outer joint member over the same area as would be necessary if the lands were of unrelieved generally part-spherical configuration. The cooperating internal and external surfaces of the outer joint member lands and cage respectively may be designed to be exactly part-spherical, i.e. surfaces of revolution about the rotational axes of the respective components of circular arcs whose centre of curvature lies on such rotational axis. Thus better cooperation ii the portions of such surfaces which do make contact with one another can be achieved.

Figure 4:
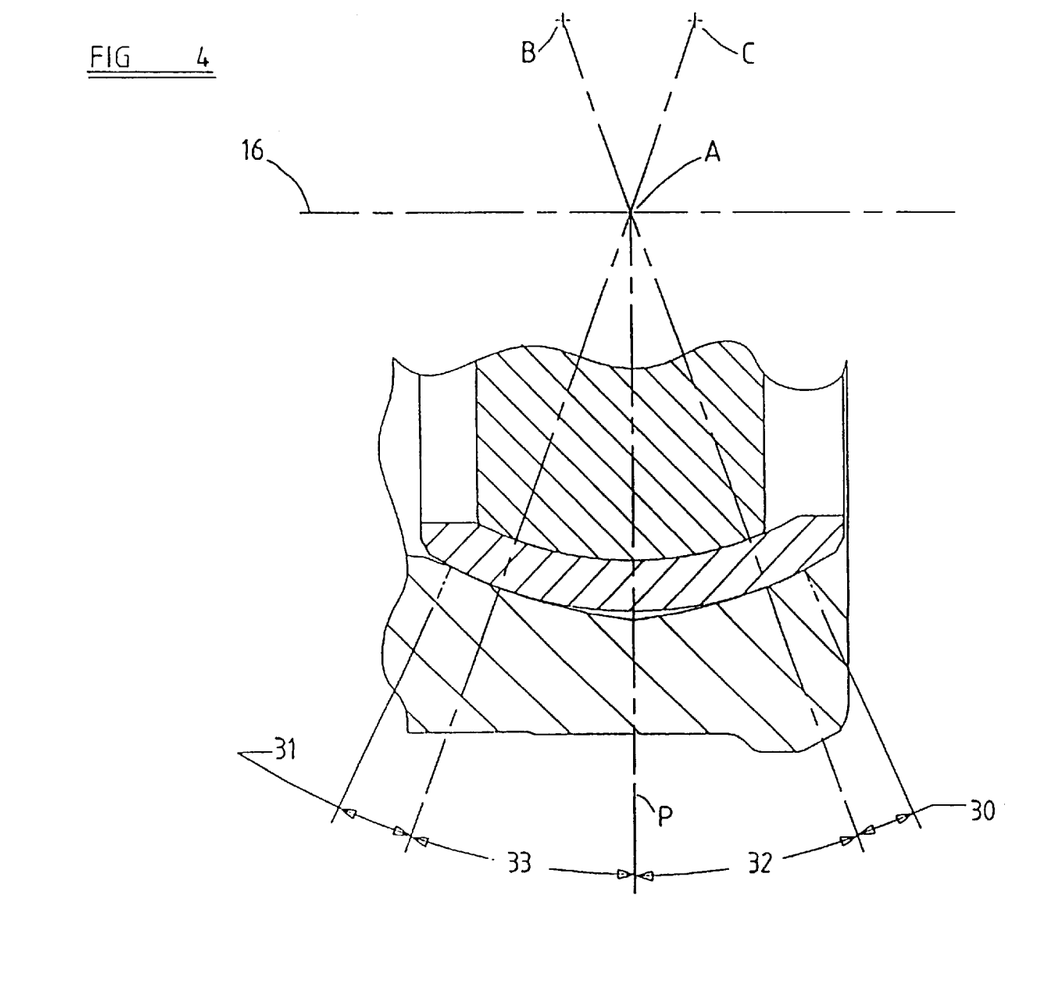
FIGS. 4, 5 and 6 are detail drawings similar to FIG. 3 showing other shapes of relief portion.
Figure 5:
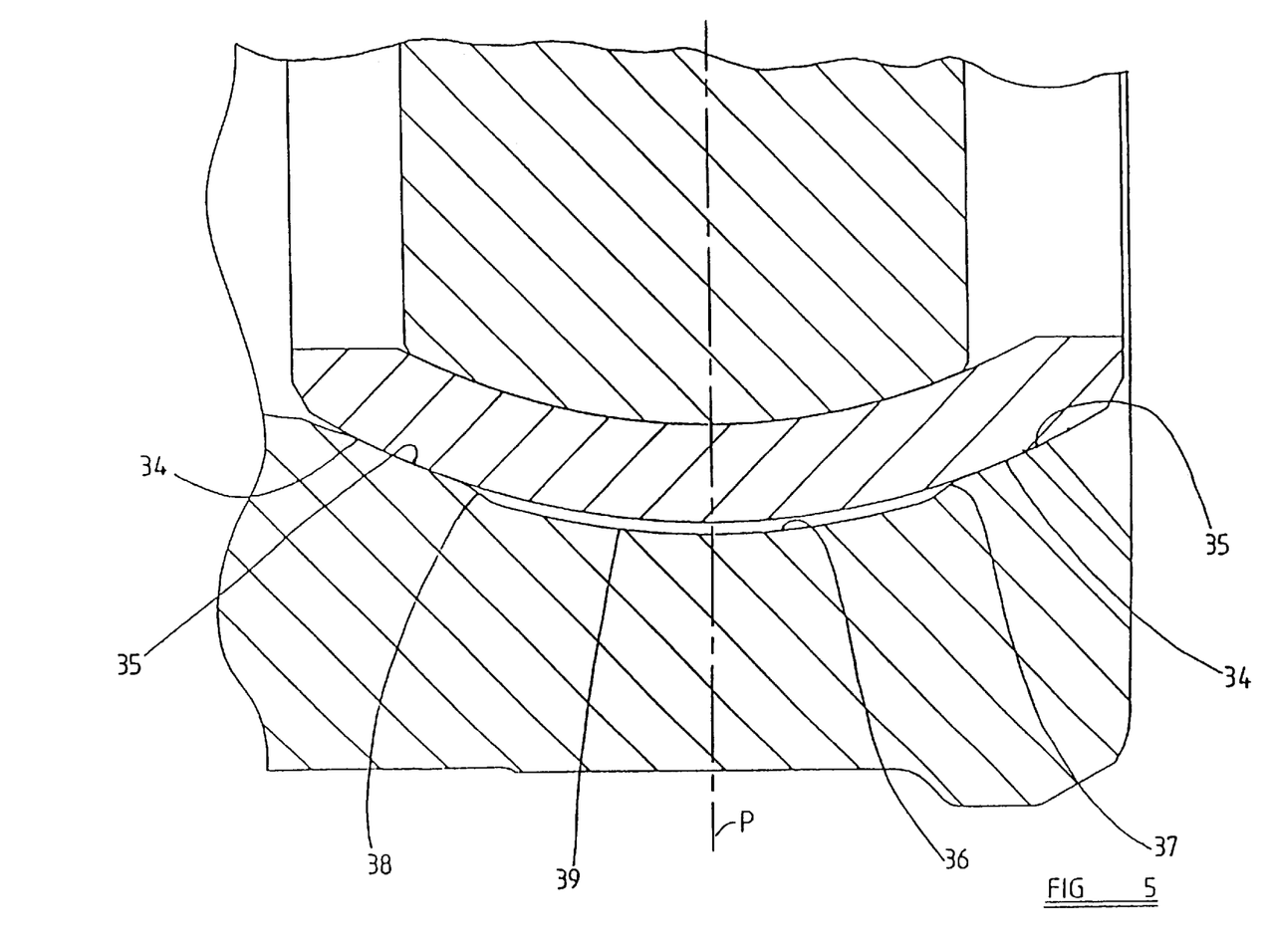

The relief portions shown in FIGS. 1–3 are defined between steps in the surface in which they are provided, these steps are constituted by an abrupt change in gradient in the surface; the change in gradient could be of any convenient angle FIG. 4 shows diagrammatically another arrangement. Surface portions 30 and 31 are the first and second contacting surfaces on the inner surfaces of the lands of the outer joint member and are circular arcs of the same radius struck from point A on the rotational axis 16 of the outer joint member. The relief portion is defined by surfaces 32 and 33 which are circular arcs struck from points B and C respectively offset from the axis 16. The arcs 32 and 33 defining the relief portion are blended where they meet and are tangent to the surface portions 30 and 31 respectively. It will be seen that the relief portions are located about the common plane P when the joint is in its unarticulated position In FIG. 5 surface portions 34 and 35 are the first and second contacting surface portions on the external surface of the cage and the lands of the outer joint member. The relief portion 36 is defined by end portions 37 and 38 of a different shape to the portions 34 and 35 which are connected by an arcuate surface portion 39 centred on the rotational axis of the joint but of greater radius than the radius of the external surface of the cage. Portions 34 and 37 meet at a point of inflexion as do portions 35 and 38. Again the relief portion is located about the common plane P when the joint is in its unarticulated position.

Figure 6:
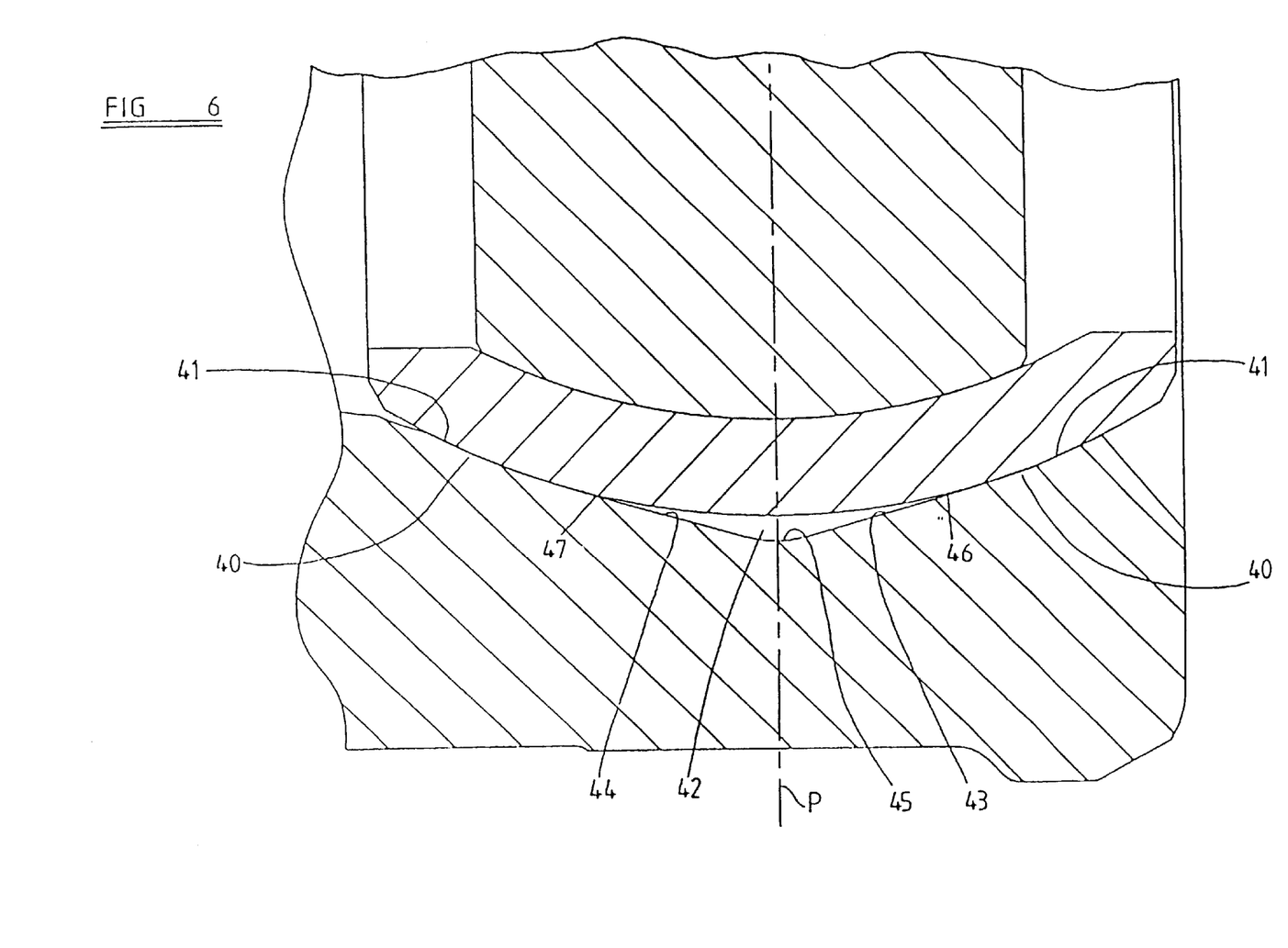

In FIG. 6 surface portions 40 and 41 are the first and second contacting portions on the external surface of the cage and the lands of the outer member. The relief portion 42 is defined by two surface portions 43 and 44 which are straight in cross-section and which are blended at 45. At the ends 46 and 47 of the surface portions 43 and 44 these are tangent to the land surface 41. The relief portion is located about the common plane P when the joint is in its unarticulated position.

The relief portions need not be symmetrical as shown. They could be composed of different shapes at their ends for example a step as shown in FIG. 3 at one end and a straight line shape as in FIG. 6 at the other end. Other combinations are possible but in all cases the relief portions extend across the whole width of the lands between the tracks on either side. They may be located about the common plane P or between the plane P and the first contacting surface portions, in each case when the joint is in its unarticulated position.

In each embodiment, the parts of the surface of each land 18 on either side of the relief portions 25; 32,33; 36 and 42 are preferably parts of the same spherical surface or surface of revolution as discussed above. However the parts could lie on different surfaces of revolution if desired.

The illustrated fixed joint is one in which the external and internal part-spherical surfaces of the cage are concentric with one another. In some fixed joints, such surfaces are not concentric and the cage is thicker at one end than at the other. The present invention is equally applicable to such joints.

Referring now to FIGS. 7 to 11, one method of manufacture of an outer member as shown in FIGS. 1 to 3 will be described.

Figure 7:
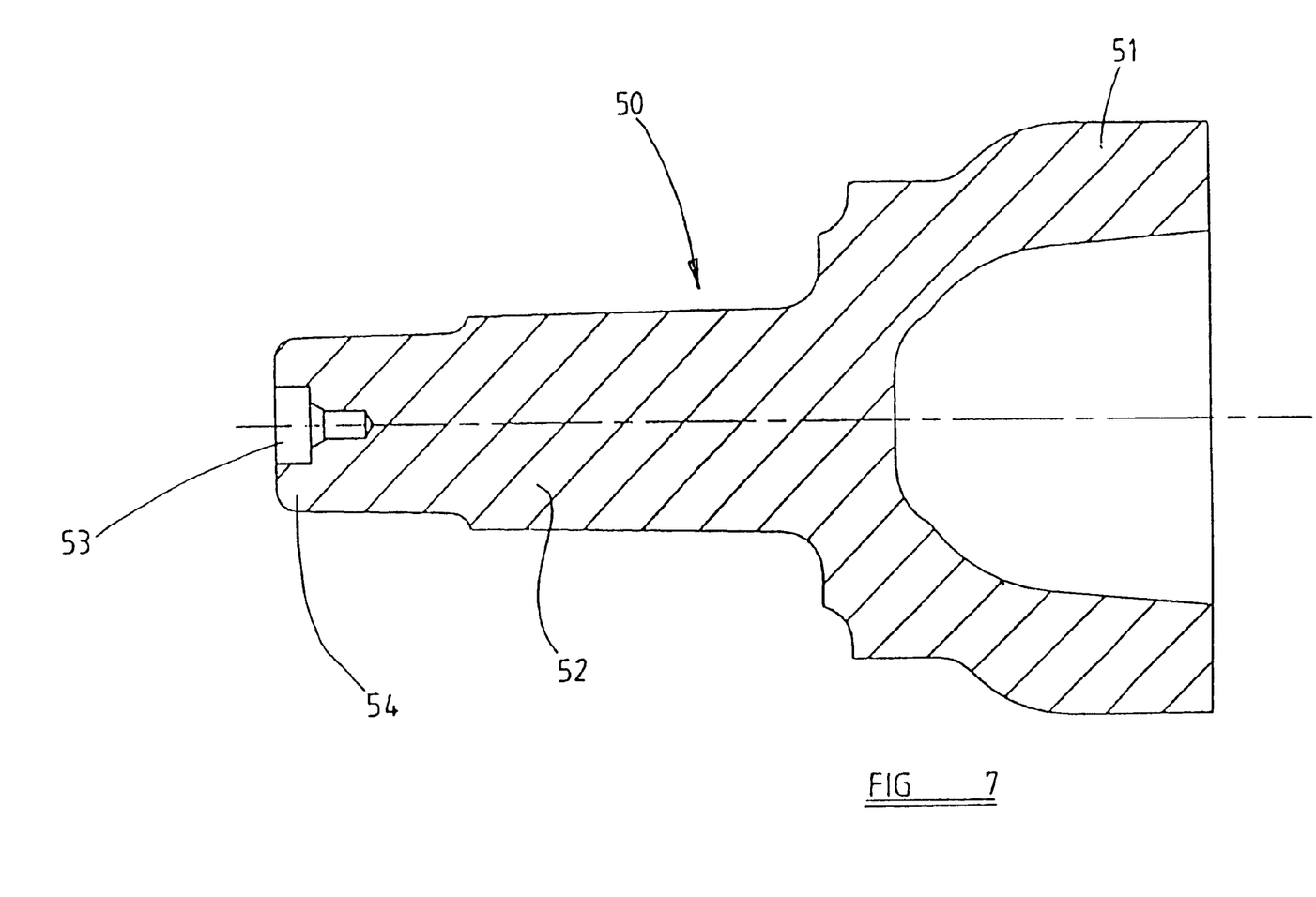
FIGS. 7 to 11 illustrate one method of making an outer member for a fixed joint of the kind specified.

Referring to FIG. 7, this shows a plain bore forging 50. This is a forging having a bell shaped portion 51 with a stem 52. The first operation is to centre drill at 53 the end 54 of the stem.

Figure 8:
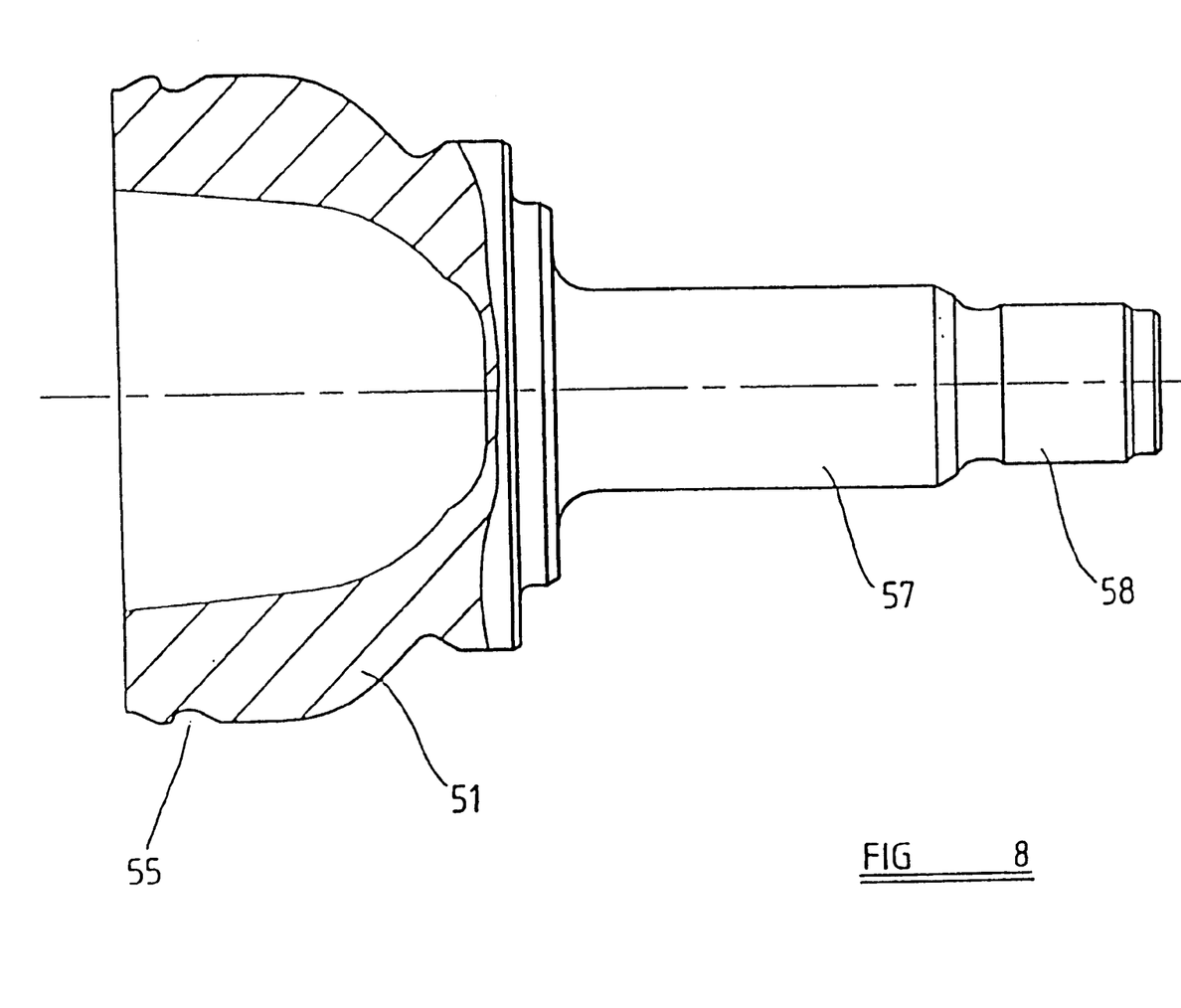

Referring now to FIG. 8, the next step is to turn the outside profile of the forging. Thus the outer surface of the bell 51 is machined to provide a groove 55 to receive a boot clamp. The stem is machined at 57 to provide a stub shaft which is subsequently splined and the end portion 58 of the stem is turned down and will be subsequently threaded.

Figure 9:
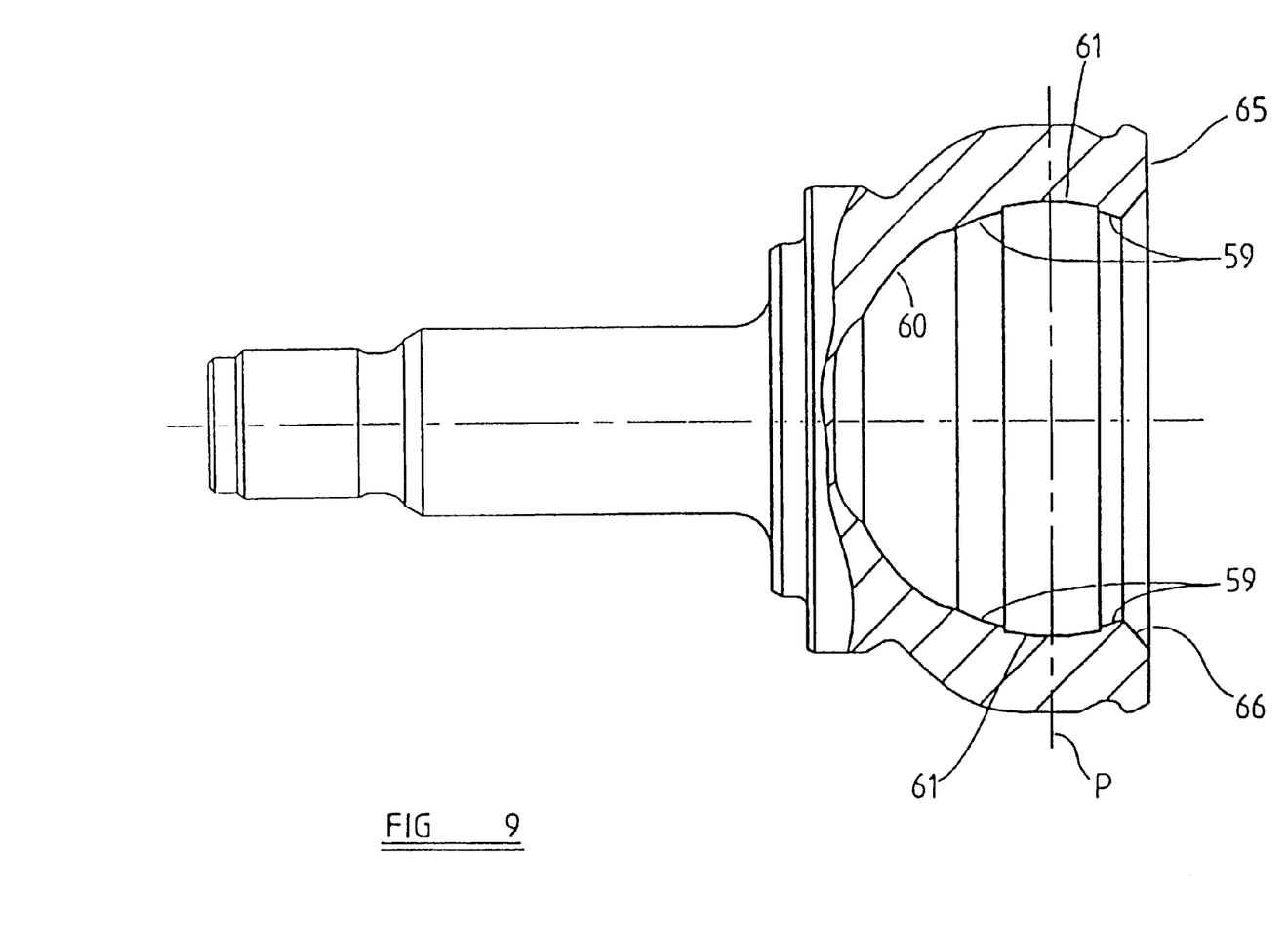

Referring now to FIG. 9, the third step is to produce a spherical surface or sphere form 59 inside the bell and to machine the front face 65 and mouth chamfer 66 of the outer member. The spherical surface 59 will ultimately provide the land surfaces between the tracks after these have been milled in the next step. The sphere form 59 is relieved at 60 adjacent the closed end of the outer joint member. Also the sphere form is provided with a circumferential relief groove 61 about the common plane P as described above. The cross section of the relief groove can be of any of the shapes described in relation to FIGS. 1 to 6 but the shape shown is that shown in FIGS. 2 and 3.

Figure 10:
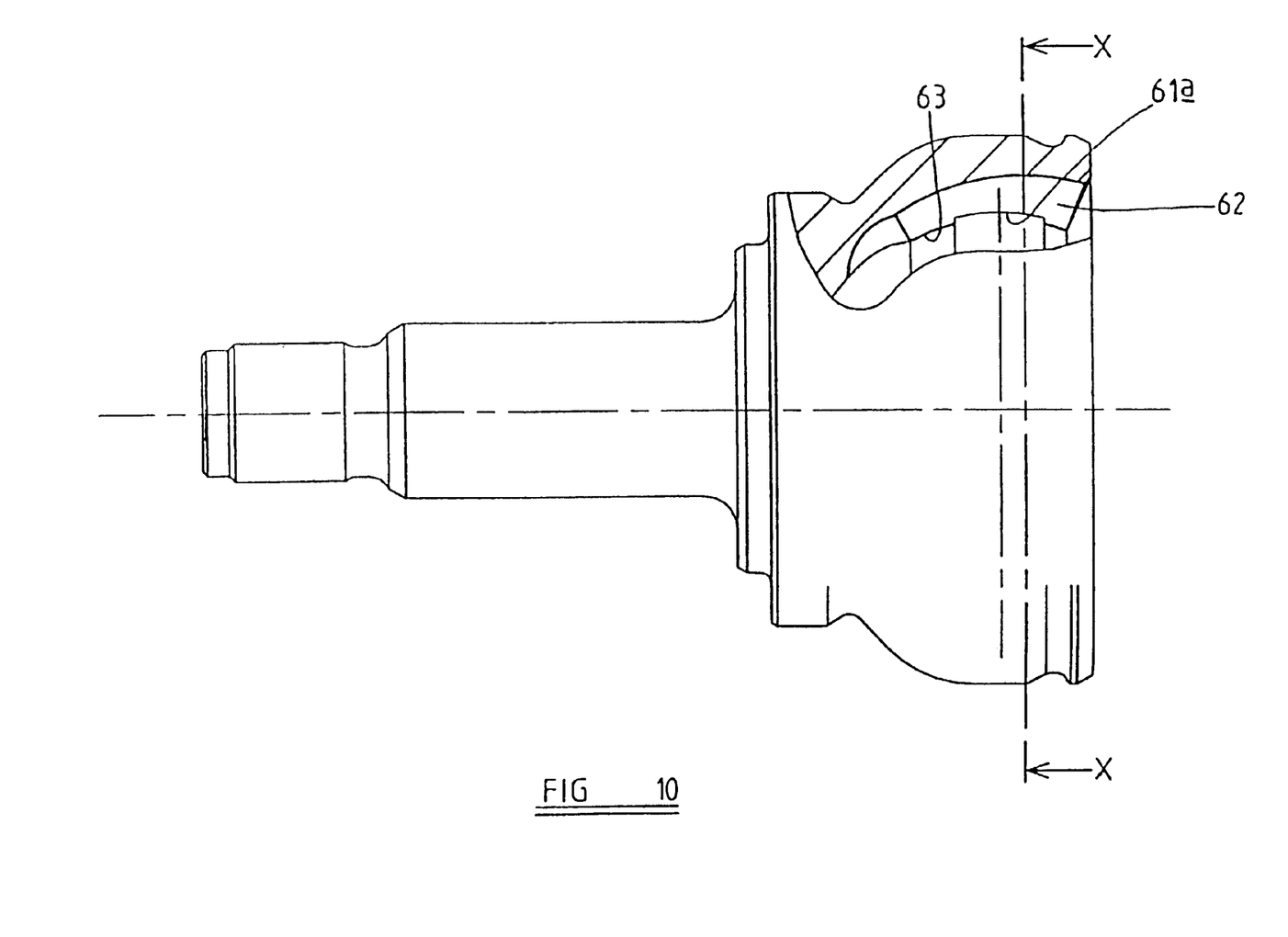
Figure 11:
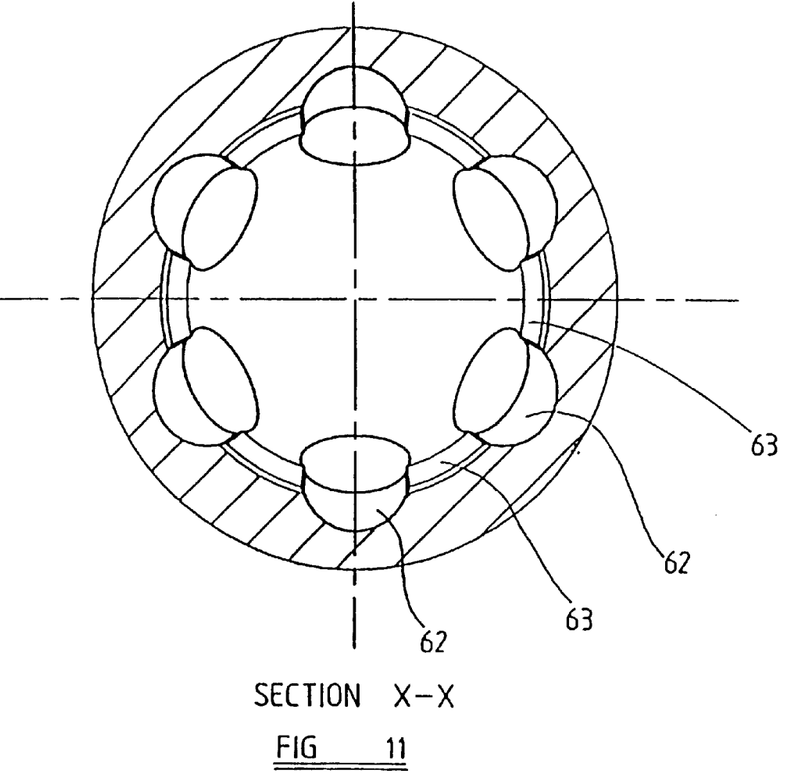

Referring to FIG. 10, the tracks 62 are now milled in two stages. First a rough milling and then a finish milling. The production of the tracks defines the lands between them and each of the lands has a relief portion 61a provided by the groove 61. FIG. 11 shows the tracks 62 and the intervening lands 63. As will be clear from FIGS. 9 and 10 the relief portions extend across the whole circumferential width of the lands between adjacent tracks.

After the tracks have been milled the spline is rolled on the part of the stem 57 and the thread rolled on the part of the stem 58.

The outer member is now subjected to a heat treatment operation to harden the track and land surfaces. The heat treatment operation may, for example, be induction hardening or case carburising. After hardening no surface treatment to remove metal is applied to the surfaces of the lands 63 except, optionally, the removal of scale produced by the hardening operation. If desired the tracks can be machined or ground.

Thus it will be seen that the lands with their relief portions are not subject to any expensive post-heat treatment operation and this is made possible by the provision of the relief in the lands which cuts down the contacting areas of the lands and the outer surface of the cage.

The outer member could be produced in other ways, for example it could be forged with rough lands and tracks and then the lands would be turned to the required shape and the tracks milled. During the turning of the lands the relief portions would be also created. After splining and threading, the outer member would be heat treated but no metal removing operation would be applied to the land surfaces after heat treatment except, optionally, to remove the scale from the land surfaces.

In yet another method of manufacture of the outer member, it would be possible to precision form the outer member and finish form the lands to the required shape, including the reliefs, while roughly producing the tracks. The tracks would then be finish milled and the outer member heat treated to harden the tracks and lands but no further surface treatment would be applied to the land surfaces except, optionally, to remove the heat treatment scale. In an alternative method the tracks could be finish formed by precision forming and the lands then turned with the reliefs, the component heat treated and the land surfaces subject, if desired, to scale removal operations but no metal removal.

It would also be possible to finish form the lands and tracks simultaneously. The relief portions could be produced with the lands or subsequently machined. After heat treatment there would be no further metal removal steps applied to the lands except optionally for scale removal.

After heat treatment the outer member could be calibrated, e.g. by coining and could be coated in whole or in part with e.g. titanium nitride or zinc phosphate.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A fixed (i.e. non-plunging) constant-velocity-ratio universal joint, comprising:
   an outer joint member (10) of hollow configuration having a rotational axis (16),
   a plurality of at least partially arcuate tracks (17) circumferentially spaced about said axis (16) in the interior of the outer joint member and having centre lines extending in meridian planes relative to said axis,
   lands (18) defined between said tracks and which are integral with the outer joint member and have radially-inwardly directed surfaces;
   an inner joint member (11) disposed within the outer joint member and having a rotational axis,
   a plurality of at least partly arcuate tracks (19) on the exterior of the inner joint member, having centre lines extending in meridian planes with respect to the rotational axis of the inner joint member and which face the tracks (17) in the outer joint member in opposed pairs,
   lands (23) defined between the tracks on the inner joint member, the lands on the inner joint member having radially-outwardly directed, surfaces;
   a plurality of balls (13) disposed one in each pair of facing tracks (17, 19) in the outer and inner joint members for torque transmission between the members;
   a cage (12) of annular configuration disposed between the inner and outer joint members (11, 10) and having openings (20) in which respective balls (13) are received and constrained so that their centres lie in a common plane (P); the cage having external and internal surfaces (22, 21) which engage the land surfaces on the outer and inner joint members respectively;
   first contacting portions (27, 30, 343, 40) of the external surface (21) of the cage and the facing surfaces of the lands (18) of the outer joint member adjacent one end (A) of the outer joint member which are in contact when the joint is transmitting torque and resist the axial forces on the cage due to the joint geometry,
   at least one of the configurations of the tracks (17, 19) in the outer and inner joint members, and the internal and external surfaces (21, 22) of the cage, being such that when the joint is articulated said common plane (P) is caused substantially to bisect the angle between the rotational axes of the joint members;
   characterised in that there is a relief portion (25; 32, 33; 36; 42) in each of said land surfaces of the outer joint member located, when the joint is in its unarticulated position, adjacent to the common plane (P), each relief portion comprising a surface portion (32, 33; 37, 38, 39; 43–47) of the outer joint member which, during articulation and use of the joint to transmit torque, does not contact the facing external surface of the cage and which extends across the whole circumferential width of the land (18) between the tracks (17) that border the land; and
   in that there are second contacting portions (127, 31, 35, 41) of the facing surfaces of the lands (18) of the outer joint member and of the external cage surface (21) to control the axial float of the cage and which are separated from the first contacting portions by the relief portions (25; 32, 33; 36; 42).

2. A fixed (i.e. non-plunging) constant-velocity-ratio universal joint, comprising:
   an outer joint member (10) of hollow configuration having a rotational axis (16), a plurality of at least partially arcuate tracks (17) circumferentially spaced about said axis (16) in the interior of the outer joint member and having centre lines extending in meridian planes relative to said axis,
   lands (18) defined between said tracks and which are integral with the outer joint member and have radially-inwardly directed surfaces;
   an inner joint member (11) disposed within the outer joint member and having a rotational axis,
   a plurality of at least partly arcuate tracks (19) on the exterior of the inner joint member, having centre lines extending in meridian planes with respect to the rotational axis of the inner joint member and which face the tracks (17) in the outer joint member in opposed pairs,
   lands (23) defined between the tracks on the inner joint member, the lands on the inner joint member having radially-outwardly directed, surfaces;
   a plurality of balls (13) disposed one in each pair of facing tracks (17, 19) in the outer and inner joint members for torque transmission between the members;

a cage (12) of annular configuration disposed between the inner and outer joint members (11, 10) and having openings (20) in which respective balls (13) are received and constrained so that their centres lie in a common plane (P); the cage having external and internal surfaces (22, 21) which engage the land surfaces on the outer and inner joint members respectively;

first contacting portions (27, 30, 343, 40) of the external surface (21) of the cage and the facing surfaces of the lands (18) of the outer joint member adjacent one end (A) of the outer joint member which are in contact when the joint is transmitting torque and resist the axial forces on the cage due to the joint geometry, at least one of the configurations of the tracks (17, 19) in the outer and inner joint members, and the the internal and external surfaces (21, 22) of the cage, being such that when the joint is articulated said common plane (P) is caused substantially to bisect the angle between the rotational axes of the joint members;

characterised in that there is a relief portion (25; 32, 33; 36; 42) in each of said land surfaces of the outer joint member located, when the joint is in its unarticulated position, either between the first contacting surface portion (27, 30, 34, 40) of the land surface and said common plane (P) or about said common plane, each relief portion comprising a surface portion (32, 33; 37, 38, 39; 43–47) of the outer joint member which, during articulation and use of the joint to transmit torque, does not contact the facing external surface of the cage and which:

is separated from the adjacent first contacting surface portion (27) by an abrupt change in the gradient of said surface in longitudinal section which may form a step (26); or is defined by a surface or surfaces (32, 33) the or each of which has a different radius of curvature from the surface of the adjacent first contacting surface portion (30) and which may be tangential to the surface of said first contacting surface portion; or in longitudinal section (43, 44) is straight; or is defined by a surface which in longitudinal section meets the surface of the adjacent first contacting surface in a point of inflexion (34, 37), each relief portion extending across the whole circumferential width of the land (18) between the tracks (17) that border the land; and in that there are second contacting portions (127, 31, 35, 41) of the facing surfaces of the lands (18) of the outer joint member and of the external cage surface (21) to control the axial float of the cage and which are separated from the first contacting portions by the relief portions (25, 32, 33), 36; 42).

3. A joint according to claim 1 wherein said first and second contacting portions (27; 32, 33; 34; 35; 40; 41; 127) of the surfaces of the lands (18) on the outer joint member are hardened, characterised in that said relief portions (25, 32, 33, 36, 42) have been produced in the surfaces of said lands (18) before the latter have been hardened and wherein, after hardening, no treatment to remove metal has been applied to the surfaces in which a relief portion has been provided except, optionally, for the removal of scale produced by said hardening.

4. A joint according to claim 1 wherein each of the first contacting surface portions (27, 32, 34, 40) on the outer joint member is substantially part-spherical.

5. A joint according to claim 1 wherein each of the second contacting surface portions (127, 33, 35, 41) on the outer joint member is substantially part-spherical.

6. A joint according to claim 4 wherein the first and second contacting surface portions (27, 32, 34, 40;127, 33, 35, 41) on the outer joint member lie on the same part-spherical surface centred on the rotational axis (16) of the outer joint member.

7. A joint according to claim 1 wherein the first contacting portions and the second contacting portions of the land surfaces respectively do not lie on the same part-spherical surface or surface of revolution.

8. A joint according to claim 1, wherein the external surface of the cage does not have relief portions.

9. A joint according to claim 1 wherein the depth of each relief portion is no greater than 150 microns with respect to the land surface at the ends of the relief portion.

10. A joint according to claim 9 wherein the depth of each relief portion is between 50 and 100 microns with respect to the land surface at the ends of the relief portion.

11. A joint according to claim 9 wherein the depth of each relief portion is between 30 and 50 microns with respect to the land surface at the ends of the relief portion.

12. An outer joint member of a fixed joint as claimed in claim 1 in a finished state ready for use in said joint and having hardened land surfaces, characterised in that said relief portions (25; 32, 33; 36; 42) have been produced in the lands (18) of the member before the surfaces of the lands have been hardened and wherein no treatment to remove metal has been applied to the land surfaces after said hardening except, optionally, for the removal of scale produced by said hardening.

13. A outer joint member according to claim 12 wherein the depth of each relief portion is no greater than 150 microns with respect to the land surface at the ends of the relief portion.

14. An outer joint member according to claim 13 wherein the depth of each relief portion is between 50 and 100 microns with respect to the land surface at the ends of the relief portion.

15. An outer joint member according to claim 13 wherein the depth of each relief portion is between 30 and 50 microns with respect to the land surface at the ends of the relief portion.

16. A method of making an outer joint member of a joint as claimed in claim 1 in a finished state ready for use in said joint comprising making a blank (50) for the member, simultaneously or sequentially producing, the tracks (17), the lands (18) and the relief portions (25; 32, 33; 36: 42) in the surfaces of said lands of said outer joint member and then heat treating said member to harden the surfaces of the lands and tracks but applying no further treatment to said land surfaces to remove metal therefrom after hardening of the member except, optionally, for the removal of scale produced by said hardening.

17. A method of making an outer joint member according to claim 16 wherein the depth of each relief portion is no greater than 150 microns with respect to the land surface at the ends of the relief portion.

18. A method of making an outer joint member according to claim 17 wherein the depth of each relief portion is between 50 and 100 microns with respect to the land surface at the ends of the relief portion.

19. A method of making an outer joint member according to claim 17 wherein the depth of each relief portion is between 30 and 50 microns with respect to the land surface at the ends of the relief portion.

* * * * *